US012423739B2

(12) United States Patent
Li et al.

(10) Patent No.: US 12,423,739 B2
(45) Date of Patent: Sep. 23, 2025

(54) SYSTEM AND METHOD FOR MODIFYING A PORTION OF A USER INTERFACE ACCORDING TO AN INTERACTION WITH A MESSAGE

(71) Applicant: Shopify Inc., Ottawa (CA)

(72) Inventors: Qiuyue Li, Toronto (CA); William Devine, San Francisco, CA (US); Joshua Lemuel Baker, Pittsburgh, PA (US); Gina Mohan Madnani, San Jose, CA (US); Valeriy Mikhaylovich Aleksenko, Washington, DC (US); Anthony Menecola, Mississauga (CA); Ashay Pathak, Brampton (CA)

(73) Assignee: Shopify Inc., Ottawa (CA)

( * ) Notice: Subject to any disclaimer, the term of this patent is extended or adjusted under 35 U.S.C. 154(b) by 344 days.

(21) Appl. No.: 18/068,025

(22) Filed: Dec. 19, 2022

(65) Prior Publication Data
US 2024/0202803 A1 Jun. 20, 2024

(51) Int. Cl.
*G06Q 30/00* (2023.01)
*G06F 40/295* (2020.01)
*G06F 40/40* (2020.01)
*G06Q 30/015* (2023.01)
*G06Q 30/0601* (2023.01)

(52) U.S. Cl.
CPC ....... *G06Q 30/0635* (2013.01); *G06F 40/295* (2020.01); *G06F 40/40* (2020.01); *G06Q 30/015* (2023.01)

(58) Field of Classification Search
CPC ................................................ G06Q 30/06–08
See application file for complete search history.

(56) References Cited

U.S. PATENT DOCUMENTS

| | | | | |
|---|---|---|---|---|
| 9,396,492 B2 * | 7/2016 | Schiff | ............... | G06Q 30/0631 |
| 9,483,789 B1 * | 11/2016 | Hanlon | ............. | G06Q 30/0631 |
| 2014/0333670 A1 * | 11/2014 | Agnetta | ............... | G06F 3/0482 345/650 |
| 2016/0301639 A1 * | 10/2016 | Liu | ......... | H04L 51/52 |
| 2021/0067598 A1 * | 3/2021 | Bhat | ..................... | H04L 67/63 |

OTHER PUBLICATIONS

"State Intellectual Property Office of China Publishes Canon's Patent Application for Information Processing Method, Information Processing Equipment and Information System", Global IP News, Information Technology Patent News, New Delhi, Oct. 19, 2015 (Year: 2015).*

* cited by examiner

*Primary Examiner* — Ethan D Civan
(74) *Attorney, Agent, or Firm* — CPST Intellectual Property Inc.; Brett J. Slaney

(57) ABSTRACT

A system and method are provided for modifying one portion of a user interface according to an interaction with a message, by displaying content associated with an item. The method includes receiving a message from a correspondent in a conversational message exchange; processing the message to detect at least one portion of the message indicative of an item; and displaying the message in a first portion of a user interface and identifying the at least one portion of the message. The method also includes detecting an interaction with the message; and modifying a second portion of the user interface comprising content associated with the correspondent, according to the interaction with the message, the modifying comprising displaying content associated with the item. Related computer-readable media are also disclosed.

21 Claims, 17 Drawing Sheets

SYSTEM AND METHOD FOR MODIFYING A PORTION OF A USER INTERFACE ACCORDING TO AN INTERACTION WITH A MESSAGE

TECHNICAL FIELD

The following relates generally to modifying a portion of a user interface according to an interaction with a message and, in particular, to modifying a second portion of the user interface according to an interaction with the message in a first portion of the user interface.

BACKGROUND

Client users may initiate item- or product-related conversations with a provider such as a merchant, e.g., prior to making a selection or a purchase. The provider may desire additional context about the client user and their history of interaction with items in order to respond in a manner that is relevant to the client user and accounts for the current state of the client user's situation.

BRIEF DESCRIPTION OF THE DRAWINGS

Embodiments will now be described with reference to the appended drawings wherein.

DETAILED DESCRIPTION

Figure 1:
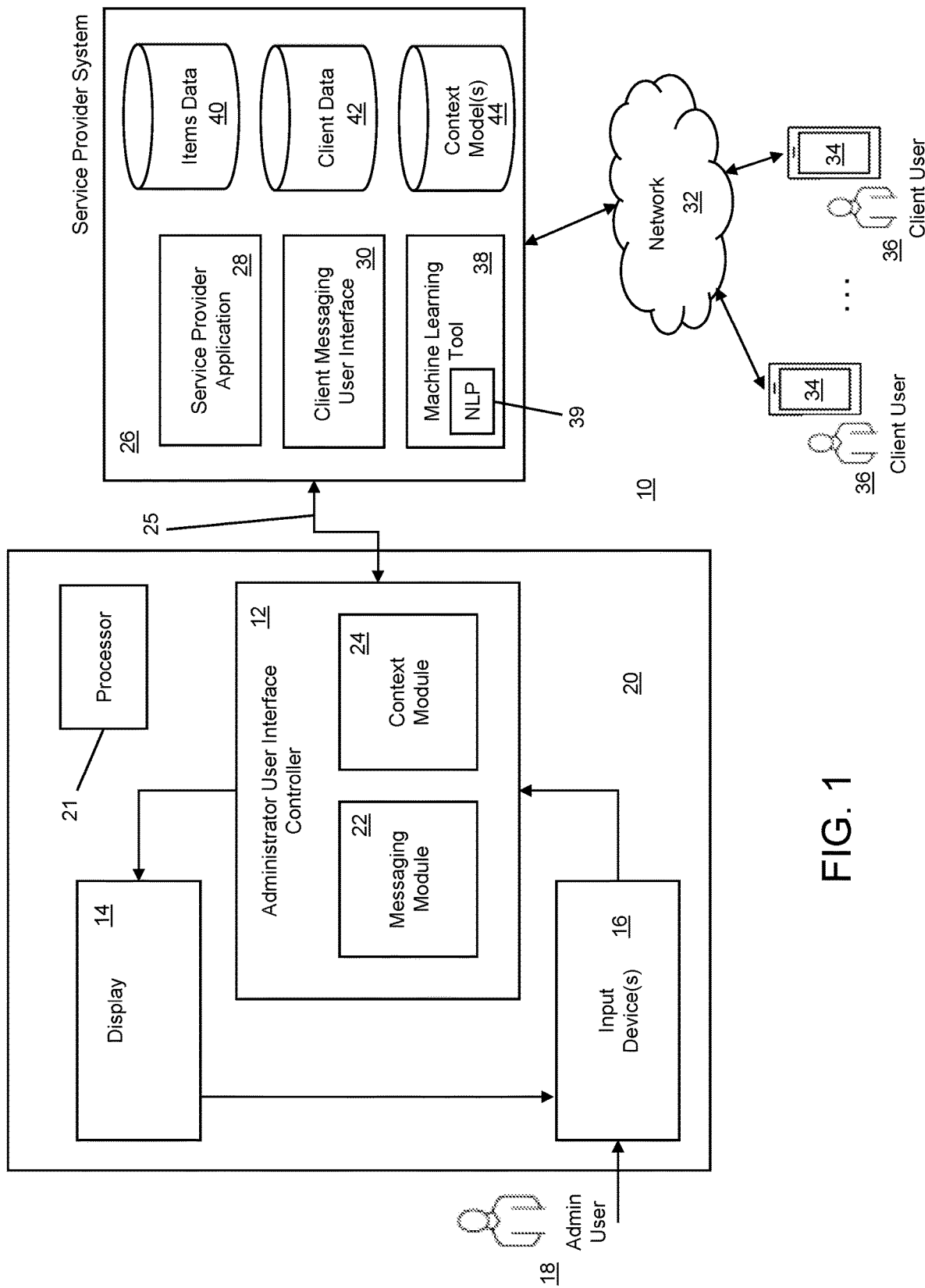
FIG. 1 is an example of a computing environment in which an administrator user interface controller for a service provider system is provided.

Providing additional context about a client user such as a buyer and their history of interacting with a system and its services and/or products (e.g., on an online store), may be performed in order to allow an administrator to respond in a manner that is relevant to the client or buyer and to consider such interaction history. In one example, a buyer may have visited numerous product pages on an online store, some of which may not be relevant to the current conversation they have initiated with a merchant. In this example, displaying a static list view of all the buyer's interactions in the current session or recent sessions may present superfluous or irrelevant information that can distract from the intent of providing such information. The following addresses these challenges by providing a system that can reduce the time taken for an administrator to navigate to relevant contextual information and, consequently, can reduce the time taken for an administrator to respond to a client user's query.

The system can be configured to automatically modify a user interface portion in an administrator's view of an inbox, in response to item (e.g., product) interactions and messages from a client user in a current or ongoing session. In particular, the system can dynamically update a context user interface portion based on the content found in a current conversation and interaction signals associated with the client user.

In one aspect, there is provided a computer-implemented method, comprising receiving a message from a correspondent in a conversational message exchange; processing the message to detect at least one portion of the message indicative of an item; displaying the message in a first portion of a user interface and identifying the at least one portion of the message; detecting an interaction with the message; and modifying a second portion of the user interface comprising content associated with the correspondent, according to the interaction with the message, the modifying comprising displaying content associated with the item.

In another aspect, there is provided a system comprising at least one processor and at least one memory. The at least one memory includes computer executable instructions that, when executed by the at least one processor, cause the system to receive a message from a correspondent in a conversational message exchange; process the message to detect at least one portion of the message indicative of an item; display the message in a first portion of a user interface and identifying the at least one portion of the message; detect an interaction with the message; and modify a second portion of the user interface comprising content associated with the correspondent, according to the interaction with the message, the modifying comprising displaying content associated with the item.

In another aspect, there is provided a computer readable medium comprising computer executable instructions that when executed by a processor, cause the processor to execute instructions comprising: receiving a message from a correspondent in a conversational message exchange; processing the message to detect at least one portion of the message indicative of an item; displaying the message in a first portion of a user interface and identifying the at least one portion of the message; detecting an interaction with the message; and modifying a second portion of the user interface comprising content associated with the correspondent, according to the interaction with the message, the modifying comprising displaying content associated with the item.

In certain example embodiments, the at least one portion of the message can include text identifying the item or an attribute of the item, and the interaction with the message comprises an interaction with the text.

In certain example embodiments, modifying the second portion of the user interface can include reordering the content associated with the correspondent to provide a focus on the item. The method can further include scrolling through the content to identify an attribute of the item.

In certain example embodiments, processing the message can include applying a natural language processing (NLP) process to text in the message. The NLP process can include a named entity recognition process used to identify the item.

In certain example embodiments, the user interface can include a third portion displaying a list comprising a plurality of conversational message exchanges, each comprising at least one different respective correspondent. The method can further include reordering the list in the third portion of the user interface based on a similarity between at least two conversational message exchanges in the list. Reordering the list can include grouping the at least two conversational message exchanges in the list. Grouping the at least two conversational message exchanges can be based on content being prepared in one conversational message exchange that is relevant to at least one other conversational message exchange. Reordering the list can be based at least in part on the item detected in the message.

In certain example embodiments, a plurality of portions of the message indicative of the item can be detected, and wherein modifying the second portion of the user interface considers the plurality of portions. A first portion of the message can name the item and a second portion of the message can include an attribute of the item. Modifying the second portion of the user interface can include displaying a set of features for the item and tagging the attribute of the item. The method can further include scrolling to the attribute based on a tag applied to the attribute.

In certain example embodiments, the interaction with the message can include an activity associated with the correspondent. The method can further include displaying an indication of the activity associated with the correspondent in the first or second portion of the user interface, the indication being actionable to modify or further modify the second portion of the user interface. The activity can include a second interaction by the correspondent with a merchant site. The second interaction can include viewing one or more items or adding or removing the one or more items to/from a checkout mechanism.

Modifying a Portion of a User Interface According to an Interaction with a Message The disclosed system can be configured to provide an administrator user interface (UI) that provides additional context about a client user such as a buyer and their history of interacting with a system and its services and/or products (e.g., on an online store) in order to allow an administrator to respond in a manner that is relevant to the client or buyer and to consider such interaction history. For example, in a retail or other service provider environment, buyers may have multiple different types of interactions with a merchant or provider site, namely what buyers view (e.g., when interacting with the site or platform more generally) and what buyers ask (e.g., when asking questions of a merchant, e.g., via a chat tool). These interactions are typically of interest to an administrator that is assisting a buyer, particularly directly via a conversational messaging exchange or "chat" tool.

The administrator UI described herein can include a number of panels or "portions". For example, one portion can provide an inbox that includes a list of current and past conversations with buyers or other correspondents, another portion can provide a view of a selected conversation, and yet another portion can provide contextual information to provide, for example, correspondent profile information (e.g., customer information) as well as information associated with the correspondent, such as current and past shopping sessions or carts, and indications of past activities such as products they have viewed, added or removed from their cart, etc. Additional portions of the administrator UI can also be provided, as exemplified below.

An example of a user interaction flow can arise in connection with a customer browsing an online store that sells items of a particular category, including certain accessories for a product. In this example, the customer selects and views various options for that accessory and adds one to their shopping cart along with other items from the online store. The system associated with the administrator UI monitors and records these customer interactions, including which items have been added to the shopping cart. The administrator UI is also integrated with a messaging feature, including a chat tool. In this example, the customer uses the chat tool to engage in a conversation with the merchant. An administrator for the merchant receives a notification that a conversation has been initiated by the customer and this can be indicated in a portion of the administrator UI that displays a list of new, ongoing, and past conversations. By having monitored and recorded the previous customer interactions, the context portion of the administrator UI can be modified to provide the administrator with relevant information concerning that customer and their shopping journey. For instance, the accessory for the product that was added to their cart may be a charm to be attached to a waterproof shoe. However, the customer may be interested in whether the charm is waterproof as well. By modifying the context portion of the administrator UI to include product details associated with the accessory and/or other items in the cart, the administrator has better access to information that would be relevant to the initiated conversation.

Additionally, when the customer enters a specific question into the conversational message exchange, e.g., "I'd like to purchase this charm for my shoes, are they waterproof?", the system can parse the text in the conversation, e.g., using natural language processing (NLP) techniques such as named entity recognition (NER), to highlight or otherwise identify the charms and the shoes in the message. The introduction of the text in the message by the customer, activities by the customer occurring in parallel (e.g., additional interactions with the online store), as well as interactions by the administrator (e.g., by selecting a highlighted text portion relevant to the question), can be used to generate signals that the system uses to dynamically and intelligently modify or remodify the content displayed in the context portion of the administrator UI accordingly. This can include calculating a relevancy score based on weights applied to the signals or other metrics applied to the content of the signals.

For example, a list of products under a recently viewed panel within the context portion can be reorganized such that the charms are repositioned at the top of the list. In another example, a "Most Viewed Products" tab may be reorganized to be shown below a relevant product details panel that show material properties that are relevant to the current state of the ongoing conversational message exchange between the administrator and the customer (e.g., waterproof properties). Other examples of relevant product details may include available sizes, a visual indicator of color variants, alternative products, available stock, etc. In another example, the system may automatically scroll down the list so that the relevant products are in the current screen view, e.g., by tagging certain attributes and scrolling to the tag.

In addition to modifying the context portion of the administrator UI based on the signals and relevancy scores, the system can modify the portion of the administrator UI that lists the conversations (e.g., an inbox) and/or the conversational messaging interface portion. In the case of the inbox, the system can keep track of similarities between topics, products or other aspects of the individual conversations such that similar conversations can be grouped together to enable the administrator to handle multiple similar inquiries at the same time. Modifications to the context portion can also be re-used between these similar conversations. Actionable items can also be tagged or flagged in the inbox or conversation, e.g., when a buyer adds or removes an item from their cart or begins searching other items. An identifier such as a clickable link or button can be displayed to enable the administrator to modify the context portion by selecting the relevant link. For example, if the buyer adds a new item to their cart, the context portion of the administrator user interface can be updated by the administrator during a conversation to pre-emptively have this information at hand if the conversation heads in this direction.

The modifications to the context portion of the administrator UI can be done dynamically and in real-time as well as offline or in the background to account for the fact that the conversations may last over a number of days or otherwise be sporadic, and the administrator may navigate into and out of several conversations in any given session.

Turning now to the figures, FIG. 1 illustrates an example of a computing environment 10 in which an administrator UI controller 12 is provided by or with a service provider system 26 such as an e-commerce site, a media services provider (e.g., home internet, phone, cellular, streaming service, financial services, etc.), a virtual healthcare provider, government service provider, etc. The computing environment 10 shown in FIG. 1 can represent a single device 20 such as a portable electronic device or the integration/cooperation of multiple electronic devices 20 such as a client device and server device or a client device and a remote or offsite storage or processing entity or service. That is, the computing environment 10 can be implemented using any one or more electronic devices 20 including standalone devices and those connected to offsite storage and processing (e.g., via cloud-based computing storage and processing facilities), such as processor 21 illustrated in FIG. 1. For example, a UI may be provided by an electronic device 20 while messaging and context data used by such a user interface can, at least in part, be stored and accessed from an external memory or application, including a cloud-based service or application.

Such electronic devices 20 can include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a virtual reality device, an augmented reality device, etc.

The administrator UI controller 12 is coupled to a display 14 to render and present/display UI elements (e.g., utilized in an administrator UI 70), on the display 14. The administrator UI controller 12 may be provided by software comprising instructions executed on a hardware processor 21. For example, one or more processors of a computing device 20 (e.g., the processor 21 shown in FIG. 1) may execute stored instructions to cause the administrator UI controller 12 to render an administrator UI 70 on the display 14 (see FIG. 4) so as to present/display UI elements on the display 14 thereby presenting a user interface. While examples referred to herein may refer to a single display 14 for ease of illustration, the principles discussed herein can also be applied to multiple displays 14, e.g., to view portions of the administrator UI 70 on separate side-by-side screens. That is, any reference to a display 14 can include any one or more displays 14 or screens providing similar visual functions. The administrator UI controller 12 receives one or more inputs from one or more input devices 16, which can include or incorporate inputs made via the display 14 as illustrated in FIG. 1 as well as any other available input to the computing device 20 and/or computing environment 10, such as haptic or touch gestures, voice commands, eye tracking, biometrics, keyboard or button presses, etc. Such inputs may be applied by a user (e.g., administrator (admin) user 18 in this example) interacting with the computing device 20 and/or computing environment 10, e.g., by operating the computing device 20 having the display 14, processor 21, and being coupled to one or more input devices 16.

The administrator UI controller 12 also includes a messaging module 22 that integrates a conversational message exchange functionality (e.g., chat or instant messaging) and can be used to integrate additional messaging such as text, email, push notifications, etc. The administrator UI controller 12 can also include a context module 24 that is used to provide a context portion in the administrator UI 70 as described in greater detail below. The context module 24 can also be configured to obtain, process, and utilize contextual information provided by the service provider system 26 and/or other sources, in order to modify, remodify, adapt, change or otherwise affect the rendering of content in the context portion of the administrator UI 70. The messaging module 22 and context module 24 are shown as separate elements in FIG. 1 for ease of illustration. That is, the messaging module 22 and context module 24 can be implemented as separate components coupled to the administrator UI controller 12 or be integrated/embedded in the administrator UI controller 12. As such, the configuration shown in FIG. 1 is for illustrative purposes and can be reconfigured to suit different computing devices 20 and/or computing environments 10. For example, the messaging module 22 could be provided by a separate entity such as a server application associated with or provided by the service provider system 26. This may include the service provider 26 licensing and utilizing a third party messaging service that is integrated into their administrator UI controller 12. Similarly, the context module 24 may be provided by the service provider system 26 via a network or other enterprise connection 25, which can include a network 32 such as that illustrated in FIG. 1 or an internal network providing the enterprise connection 25. The network 32 may also be utilized to permit outside entities such as client users 36 operating personal communication devices 34 (referred to herein generally as "client devices 34") to interface and communicate with the service provider system 26. While the client devices 34 are illustrated as connecting to the service provider system 26, other connectivity can be provided to enable the client devices 34 to communicate directly with the messaging module 22 and/or context module 24 to provide relevant information to the administrator UI controller 12 in other configurations.

Such communication network(s) 25, 32 may include a telephone network, cellular, and/or data communication network to connect different types of client- and/or server-type devices. For example, the communication network 25, 32 may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

In the example configuration shown in FIG. 1, the service provider system 26 includes a service provider application 28, which can include any front-end user interface that the associated service provider uses to communicate with client users 36 via their client devices 34. For example, the service provider application 28 can include a mobile app or a website (with or without login/profile capabilities). The service provider application 28 can also be integrated with or coupled to the administrator UI controller 12 to enable admin users 18 to communicate directly with client users 36 as illustrated further below. The service provider system 26 also includes a client messaging UI 30, which is shown separately from the service provider application 28 for illustrative purposes and could be provided as an integrated/embedded widget or module in the service provider application 28. The client messaging UI 30 enables the client users 36 to communicate with the associated service provider, in particular the admin users 18 employed to communicate with clients or customers. As with the messaging module 22, the client messaging UI 30 can be provided through a custom interface or by integrating a third party messaging service into the service provider application 28.

The service provider system 26 can include a memory, database, or other datastore for items data 40, which can include information concerning a product or service (referred to generally herein as "items") provided by the service provider, e.g., products sold by an online retailer. Also shown in FIG. 1 is a memory, database or other datastore for client data 42, which is used to store information associated with the client users 36, e.g., profile information, interaction data, account information such as shopping cart items, etc.

In the example configuration shown in FIG. 1, the service provider system 26 also includes a machine learning tool 38. The machine learning tool 38 can be used to train machine learning models associated with products, product details, customer interactions, or other characteristics to determine how to process inputs or signals related to context to determine suitable modifications to a set of contextual data, herein referred to as context models 44. The machine learning tool 38 can also be used to apply processes such as algorithms in or operated by an NLP module 39 to identify context in message text such as product names or characteristics or content from other signals such as customer interactions with the service provider system 26, which can be used to provide cues to the admin user 18 or interactive links to enable the admin user 18 to dynamically modify contextual content. For example, the machine learning tool 38 can use the NLP module 39 to highlight or otherwise identify product names or product details embedded in a customer message to automatically modify a context portion of the administrator UI 70 and/or to enable the admin user 18 to select a highlighted word or phrase to dynamically do the same. The machine learning tool 38 can likewise use the items data 40 and client data 42 to generate context signals that can be input to a context module 44 to determine how or when to modify the context portion of the administrator UI 70.

The machine learning tool 38 can be used to train machine learning models such as the context model(s) 44 by generating classifiers that can be used to predict an appropriate set of modification parameters given an input related to the item(s) or client user 36. For example, a client user 36 that has interacted with certain products, added or removed items from a shopping cart, has added certain information to their profile, has interacted/messaged the service provider system 26 in various ways, among other interactions or signals can generate inputs to the machine learning tool 38 to run that data against a set of classifiers that have been generated and can be used to understand how the input variables relate to the associated classes. The classifiers can be trained using the machine learning tool 38 (or another machine learning system) by labeling a dataset of contextual data to enable the input context signals or other input data to be used to find the most appropriate context model 44. The context model 44 can be built and trained in this way and used to identify a relevant set of modifications to be applied to the administrator UI 70 by the administrator UI controller 12, including within the messaging, inbox, and context portions of the administrator UI 70 associated with the model 44, that are based on the contextual data and prior interactions with the system 26 that are used to train the dataset. That is, specific datasets can be used to train context models 44 that identify desirable modifications to certain portions of the administrator UI 70 based on a class, the class being associated with an item/product, user or user type, interaction or interaction type, or other characteristic used to classify an input to the machine learning model 38 to in turn identify the appropriate modification parameters and content to be added, moved, reordered, removed, etc.

Figure 2:
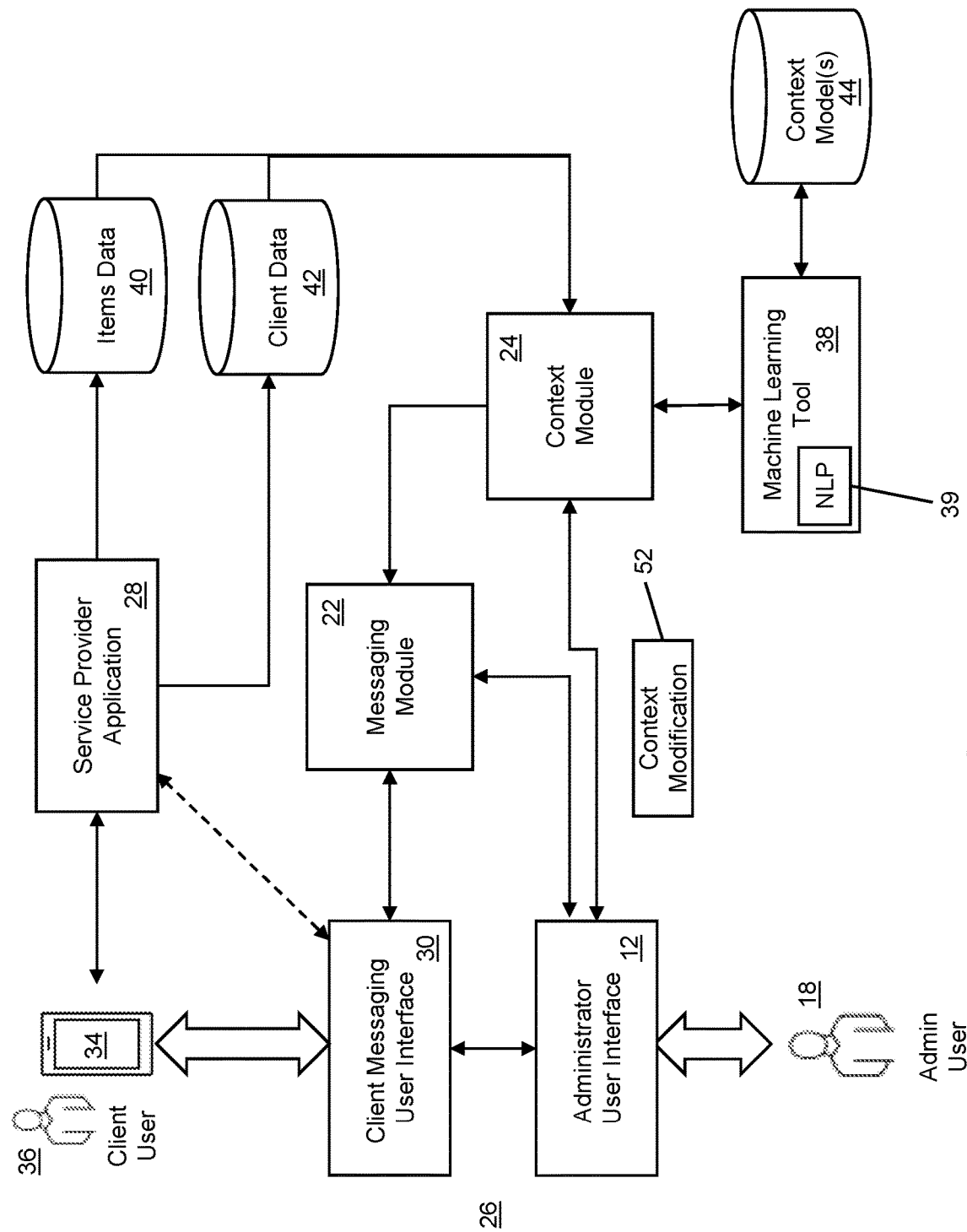
FIG. 2 shows a workflow for generating contextual modifications to the administrator user interface based on interactions between a client user and the service provider system.

FIG. 2 illustrates a workflow that can be implemented in using interactions by a client user 36 with the service provider system 26, to generate contextual content and/or modification parameters to apply to such content to enhance the administrator UI 70 for an admin user 18. As seen in FIG. 2 (according to the example configuration in FIG. 1) the client user 36 can interact with the service provider system 26 via the client messaging UI 30 (e.g., via a chat widget provided via the service provider application 28) while the admin user 18 can interact with the service provider system 26 via the administrator UI controller 70. For example, the admin-facing portion of a chat can be provided by integrating the client messaging UI 30 into a portion of the administrator UI 70. As noted above, the administrator UI controller 12 can include or otherwise utilize the messaging module 22 to enhance the functionality of the messaging features provided by the service provider application 28 and administrator UI controller 12. The client user 36, via their client device 34, can also interact with the service provider application 28 in other ways. For example, the service provider application 28 may provide a mobile app or website for online shopping or provide a portal to the service provider in other environments such as media service providers, healthcare providers, and government service providers. These interactions with the service provider application 28 can include actions that generate new items data 40 and/or client data 42 and which can provide new or modified contextual data for the context module 24. For example, by updating a user profile, the client data 42 can be modified and used by the context module 24 to revise a demographic categorization. In another example, by adding an item to a shopping cart in an online shopping environment, the items data 40 can be updated with respect to inventory or shopping cart contents. It can be appreciated that shopping cart contents can also be stored and updated via the client data 42, e.g., by saving client-related inventory data in the client data 42 datastore.

The context module 24 can access the machine learning tool 38, including any available or provided sub-modules or algorithms such as the NLP module 39, to input new contextual data into a context model 44, to determine an appropriate context modification 52 to a context portion of the administrator UI 70. It can be appreciated that the machine learning tool 38 may not be required to generate such context modifications 52. For example, a set of rules or heuristics can be used to map actions to modifications 52. Such rules can dictate that, for instance, any interaction with a product or item will cause the context module 24 to reorder information for that product or item to the top of a list of contextual information. Weighting and scores can also be generated according to predetermined formulae to apply similar rules-based modifications. That is, the context module 24 can rely on various levels of sophistication and complexity to determine the context modifications 52. Moreover, the context module 24 can rely on inputs from the admin user 18 via the administrator UI controller 12 to determine a dynamic context modification 52. For example, as discussed above, the admin user 18 can interact with highlighted or otherwise identified portions of text in a chat to have the context module 24 update the contextual information accordingly. As shown in FIG. 2, the context module 24 can also interface with the messaging module 22 to modify other portions of the administrator UI 70. For example, contextual information detected from client user interactions can cause the context module 24 to update a messaging portion, inbox, or other portions of the administrator UI 70 that are separate from the context portion.

Figure 3:
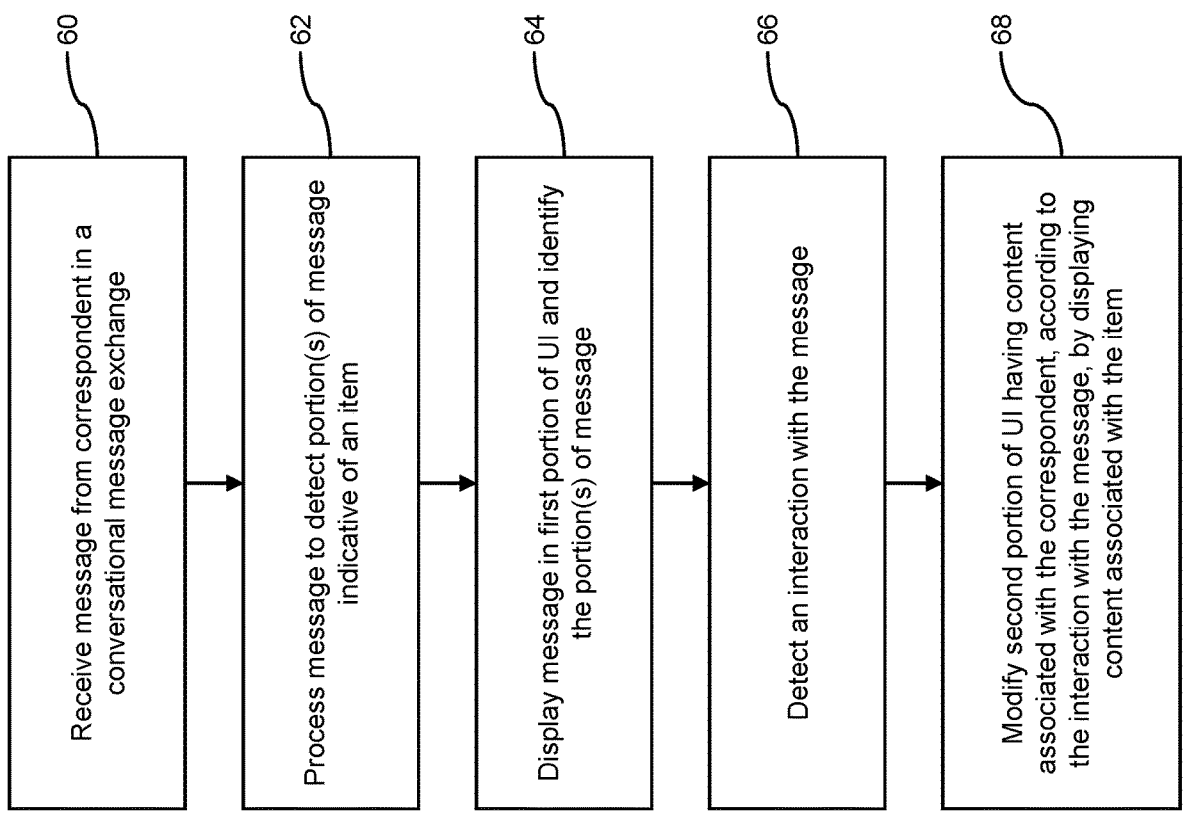
FIG. 3 is a flow chart illustrating example operations for modifying a second portion of the administrator user interface according to an interaction with a message in a first portion of the administrator user interface.

Referring now to FIG. 3, a flow chart is provided illustrating example operations for generating and utilizing context modifications 52 for updating and enhancing the administrator UI 70 as illustrated in FIG. 2. The operations shown in FIG. 3 may be implemented by an electronic device (e.g., computing device 20 shown in FIG. 1), a server, or other computing device 20 in the computing environment 10 represented by the service provider system 26 and any other device utilized to use the administrator UI controller 12 to provide the administrator UI 70 to the admin user 18. At block 60, the service provider system 26, using the service provider application 28 or client messaging UI 30, receives a message from a correspondent in a conversational messaging exchange. For example, a client user 36 may send a message to an admin user 18 via the client messaging UI 30 with a question regarding a product or service.

At block 62, the message is processed to detect a portion of the message that is indicative of an item, including the item itself or an associated property or characteristic. For example, the message can be processed to detect a product name or feature of the product that has been posed in a question. The portion of the message can thus be used to generate new contextual information that can be used to enhance the administrator UI 70 for the admin user 18.

At block 64, the message is displayed in a first portion of the administrator UI 70, which has been referred to above as a messaging portion. For example, the administrator UI controller 12 may be operated to provide the administrator UI 70 to include a portion that displays the messages composed by correspondents in a conversational messaging exchange such as a chat or instant messaging session. At block 64 the context module 24 also identifies the portion of the message. This can include highlighting or otherwise flagging or tagging the portion of the message directly in the message or in some other way, such as identifying the corresponding contextual information in a context portion of the administrator UI 70. In this way, an interaction with the message can be detected at block 66, which is performed by the client user 36 (e.g., by typing the message, interacting with service provider application 28 to view, add, remove items, etc.) or by the admin user 18 (e.g., by selecting highlighted text or otherwise showing an interest in the content by dwelling on content, using a voice command, etc.) As such, the operations performed in blocks 64 and 66 can represent any interaction signal within or exchanged with the computing device 20 and/or computing environment 10 that is associated with the message from the correspondent in the conversational message exchange such that the contextual information is updated to provide current and relevant information to the admin user 18.

At block 68, the service provider system 26, e.g., via the context module 24 utilized by the administrator UI controller 12, modifies a second portion of the administrator UI 70 having content associated with the correspondent, referred to earlier as a context portion of the administrator UI 70. This can be done by displaying content associated with the item for which the portion of the message is indicative as detected in block 62. As will be exemplified below, the modifications can include any change or update or manipulation to content (including adding new content) in the context portion of the administrator UI 70.

Figure 4:
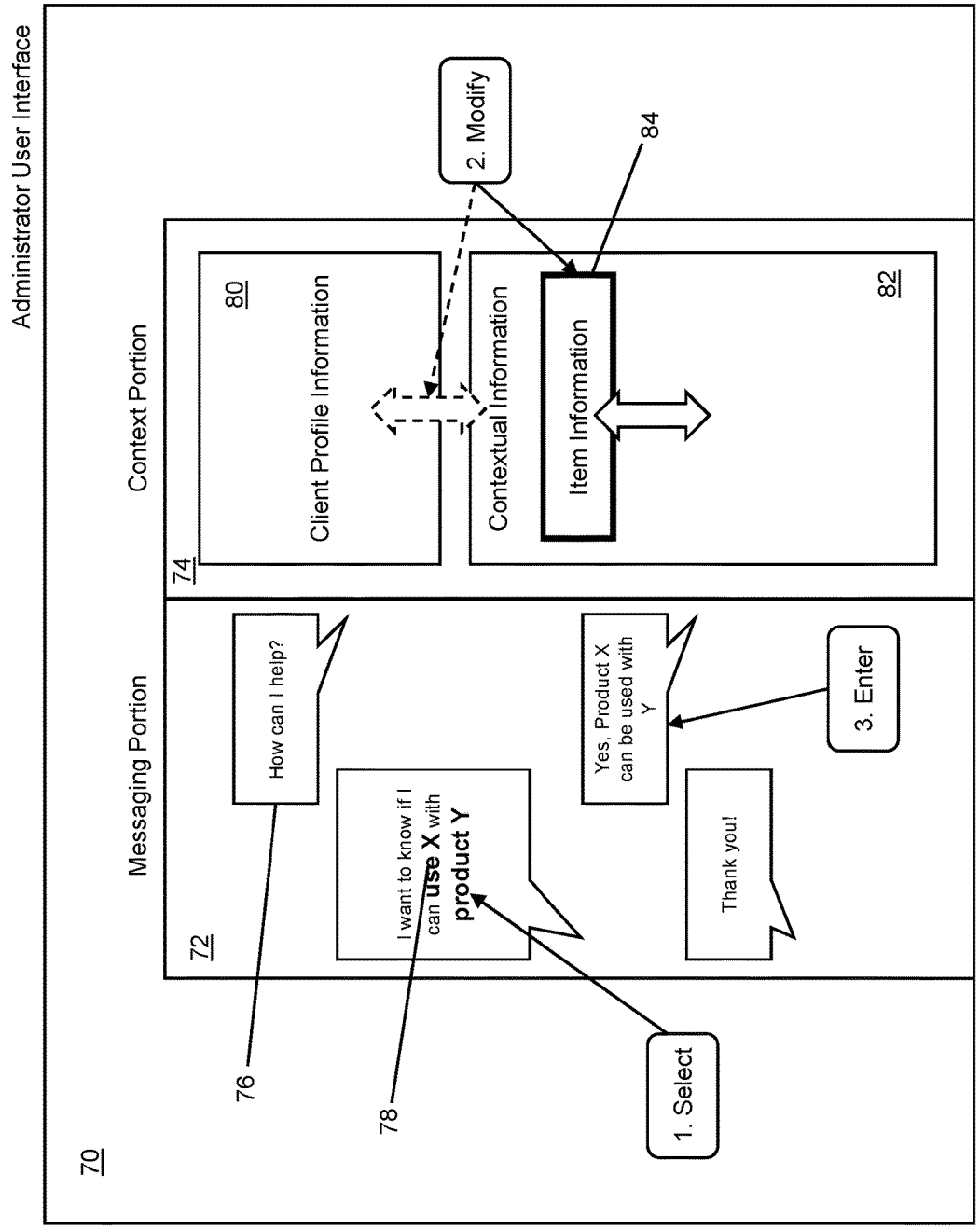
FIG. 4 shows an example of an administrator user interface having a messaging portion and a context portion.

FIG. 4 illustrates an example of the administrator UI 70 provided by the administrator UI controller 12. The administrator UI 70 can include various sections, tabs, panes, panels, and widgets, which are omitted from FIG. 4 for ease of illustration. In FIG. 4, an example of a messaging portion 72 and a context portion 74 are shown. The messaging portion 72 in this example represents a panel, pane, window, or section, commonly referred to generally herein as a "portion", that includes visual representations of messages 76 exchanged in a conversational messaging exchange. The messages 76 can be aligned in the messaging portion 72 based on the sender of the message 76, in this example right-justified for the admin user 18 and left-justified for the client user 36. The messaging exchange in this example includes a first message 76 from the admin user 18, which says "How can I help?". This first message 76 may be automatically populated when the client user 36 opens or otherwise accesses the client messaging UI 30 or may be entered and sent by the admin user 18. The client user 36 provides a first reply message 76, which says "I want to know if I can use X with product Y". This message 76 has been processed by the administrator UI controller 12, e.g., using the context module 24 that can leverage the NLP module 39 provided by the machine learning tool 38, to determine contextual information from the content of the reply message 76. In this example, the context module 24 identifies portions 78 of the message 76 that relate to products, services, and/or features or characteristics of those products or services. Specifically, "use X" and "Product Y" are highlighted using a bolder font directly in the message 76. In this way, the admin user 18 of the administrator UI 70 can be alerted to relevant information in the conversational message exchange as a cue to either interact with the message 76 to obtain further or more targeted contextual information in the context portion 74 or otherwise be alerted to potential modifications that are dynamically and/or automatically applied to the context portion 74.

By having a separate context portion 74, significantly more information can be provided to the admin user 18 without overwhelming the messaging portion 72, e.g., by including pop-ups or inserted messages that obscure the flow of the messaging conversation. Moreover, the independent context portion 74 can be dynamically and interactively updated, rearranged, reordered, filtered, or otherwise modified to adapt to the nature and cadence of the messaging conversation while being conveniently located adjacent to the messaging portion 72.

In this example, the admin user 18 selects product Y from the message 76 at step 1, which then causes the context module 24 to modify the context portion 74 at step 2. For example, item information 84 associated with product Y can be moved to a more prominent location in a contextual information pane 82 thus dynamically reordering the contextual information for the admin user 18. Optionally, as illustrated in dashed lines, a client profile information pane 80, which provides information relevant to the specific client user 36, can be moved below the contextual information pane 82 such that the relevant information is more conveniently placed for the admin user 18 that has selected the identified portion 78 in the message 76. By providing a separate context portion 74 and separate panes 80, 82 within the context portion 74, much more contextual information can be provided, in different and more meaningful and convenient and/or granular ways when compared, for example, to embedding information within a chat (i.e., in the messaging portion 72) where it would disappear as the chat progresses. Additional space can also be dedicated to the context portion 74 to provide contextual information and contextual updates independently from the cadence and status of the conversational messaging exchange.

It can be appreciated that the interaction with the message 76 can also be composed or generated by the system or the client user 36. For example, the interaction with the message 76 can include the entry of the content portion 78 by the client user 36 or the parsing of the text by the context module 24 and machine learning tool 38 to automatically perform the modification at step 2 in FIG. 4. That is, any interaction with or related to the creation of the messages 76 or actions associated with content of the messages 76 in the messaging portion 72 can be used as a trigger to perform a modification to the context portion 74. As illustrated further below, this can also include parallel interactions with the computing device 20 and/or computing environment 10 that are performed by the client user 36 or the admin user 18, such as interacting with the service provider application 28 to browse or select other items, update a shopping cart, update profile information, etc.

At step 3, the admin user 18 can more quickly and efficiently type a further message 76, which says "Yes, Product X can be used with Y" based on information gleaned from the modifications to the context portion 74. While this example includes a substantially real-time exchange of messages, it may be noted that the exchange of messages 76 in the messaging portion 72 can also occur over longer periods of time. In such a scenario, the relevant contextual information could change over time and, by automatically updating the context portion 74 of the administrator UI 70, the context module 24 can enable the admin user 18 to more quickly recall the context of the ongoing messaging exchange or to react to changes, such as the client user 36 having removed product X or product Y from their shopping cart.

Figure 5:
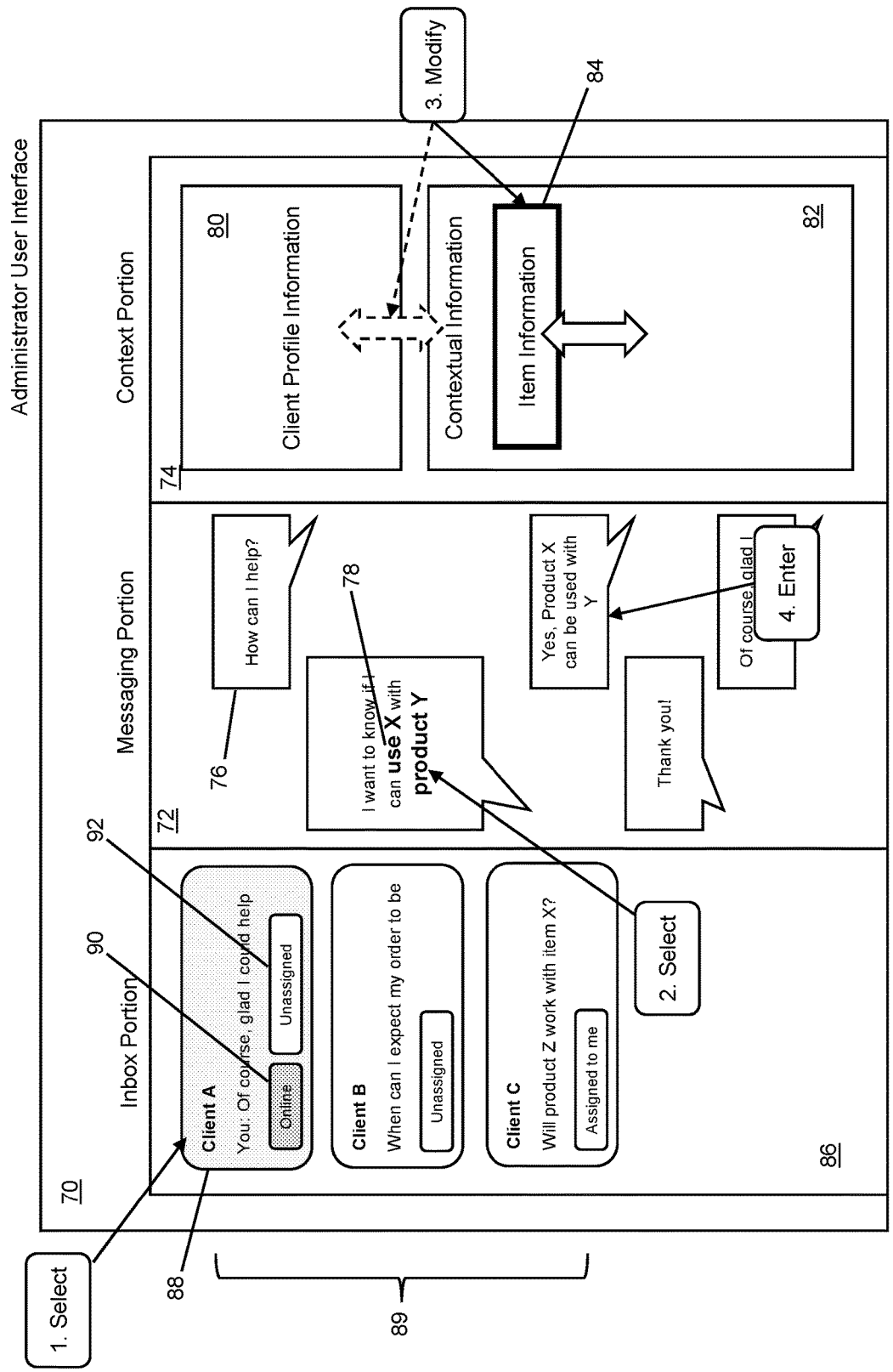
FIG. 5 shows an example of an administrator user interface having a messaging portion, a context portion, and an inbox portion.

Referring now to FIG. 5, the administrator UI 70 provided by the administrator UI controller 12 is shown with an additional portion, namely an inbox portion 86. The inbox portion 86 includes a list 89 of conversational message exchanges 88 or threads of messages with a particular correspondent, in this example Client A, Client B, and Client C. The visual indication of the message exchange 88 can include a presence indicator 90, e.g., to indicate whether the correspondent Client A is online or offline, busy, etc.; and can include an assignment indicator 92, to indicate whether the specific exchange 88 with that client user 36 has been assigned. In this example, the messaging exchange 88 with Client A has been selected from the list 89 at step 1. This causes the messaging portion 72 to display the exchange of messages 76 described above and shown in FIG. 4. The context portion 74 shown in FIG. 5 is also similar to that shown in FIG. 4. The administrator UI 70 provided by the administrator UI controller 12 can therefore include additional UI portions to enhance the admin user's ability to interact with client users 36, in this case multiple client users 36. Moreover, the presence indicator 90 and assignment indicator 92 can be provided to allow the admin user 18 to prioritize their time with respect to which messaging exchange 88 to access and interact with at the current point in time. For example, an online client user 36 that has been assigned may be higher in priority than a dormant client user 36. Similarly, messaging exchanges 88 with unread messages may be given a higher priority than those that are dormant.

Figure 6:
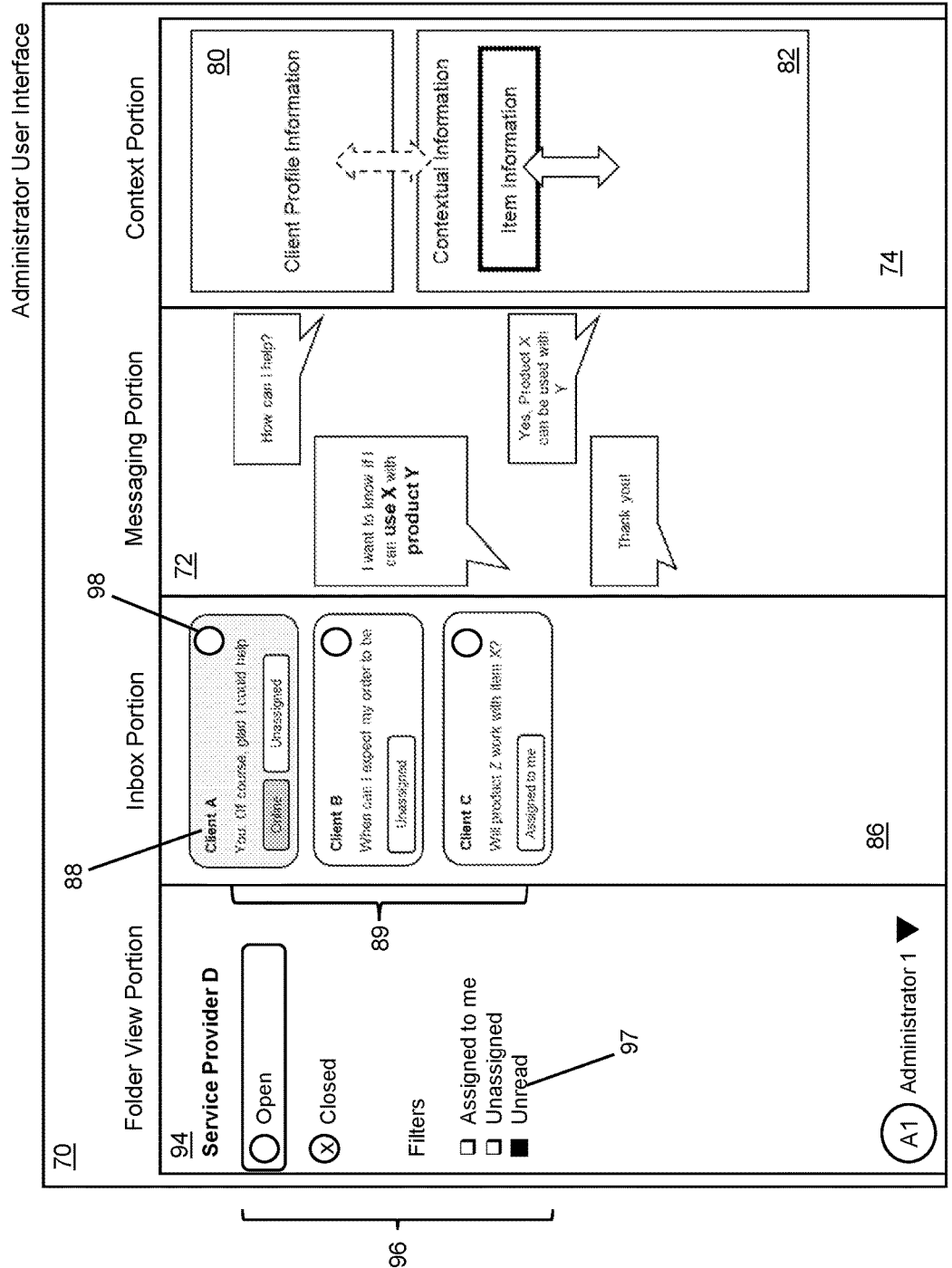
FIG. 6 shows an example of an administrator user interface having a messaging portion, a context portion, an inbox portion, and a folder view portion.

FIG. 6 illustrates yet another UI portion that can be provided in the administrator UI 70 by the administrator UI controller 12, namely a folder view portion 94. The folder view portion 94 includes a set of folder options 96, including a filter 97 for read/unread and/or assigned/unassigned messaging exchanges 88. The options 96 also include an ability to select open or closed messaging exchanges 88 and in this example open exchanges 88 are displayed in the inbox portion 86. An open indicator 98 can be used, as shown in FIG. 6, to indicate whether the messaging exchange 88 with that client user 36 is open or closed. The messaging portion 72 and context portion 74 can be provided and modified as described above and shown in FIGS. 4 and 5. FIG. 6 illustrates that various additional UI portions can be presented within the same administrator UI 70 to provide the admin user 18 with levels of control and customization to enhance their experience in interacting with client users 36.

Figure 7:
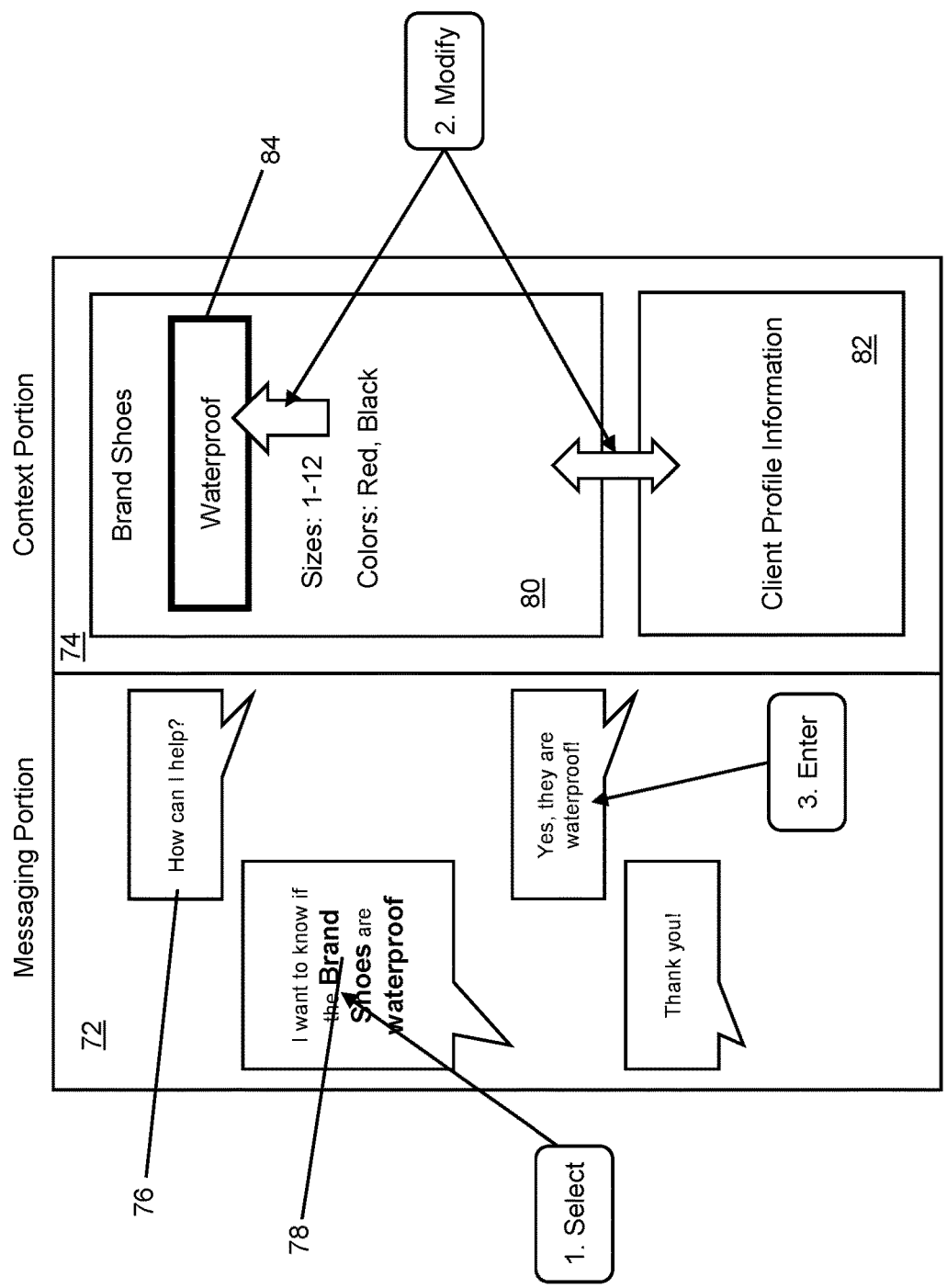
FIG. 7 shows an example of the messaging portion and the context portion with a contextual modification applied, for a merchant-buyer conversational message exchange.

The messaging portion 72 and context portion 74 are shown in isolation in FIG. 7 to illustrate a specific example. In this example, the portions 78 identified in the reply message 76 from the client user 36 names Brand Shoes and asks whether these shoes are waterproof. As such, the message content includes the identification of an item and a property or characteristic of that item. By selecting the Brand Shoes portion 78 of the reply message 76 at step 1, two modifications to the context portion 74 are made at step 2, namely, to move the client profile information pane 82 to below the context pane 80 for Brand Shoes, in which the modified information includes movement of the waterproof specification for the shoes to an upper portion of the context pane 80. The modifications in step 2 can be done at the same time as the exchange of messages 76 or pre-emptively as the reply message is received such that the admin user 18 can enter the reply "Yes, they are waterproof!" in step 3 without requiring additional effort and time to find the relevant information. While in this example the conversation appears to end, if the client user 36 has an additional question regarding the properties of the Brand Shoes, the context pane 80 can remain at the top of the context portion 74 and further modified if appropriate, based on the subsequent messages 76. Moreover, as noted above, other signals can be detected by the context module 24 that relate to other interactions by the client user 36 or admin user 18 that can also be used to further modify the context pane 80 (automatically or reactively) for an expected question or topic related to that interaction. For example, if the client user 36 then adds a waterproofing spray to their shopping cart, the context module 24 could pre-emptively obtain information concerning that spray or details of other available sprays, e.g., if stock is limited for the one that the client user 36 selected, if another spray is on sale, etc.

Figure 8:
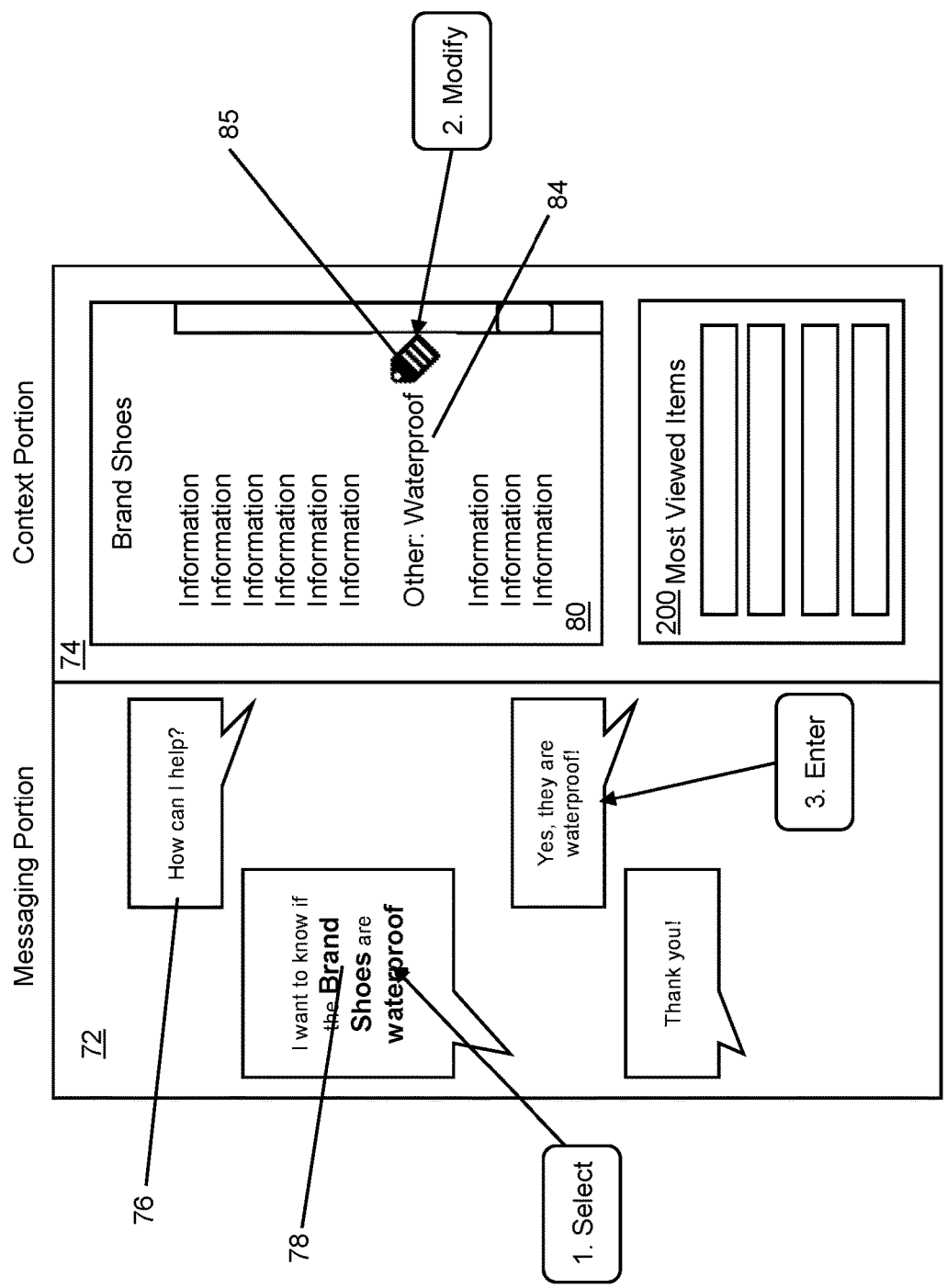
FIG. 8 shows an example of the messaging portion and the context portion with a contextual modification applied, for another example of a merchant-buyer conversational message exchange.

The messaging portion 72 and context portion 74 are shown in isolation in FIG. 8 to illustrate another example of a modification 84 to the context pane 80. In this example, the messaging portion 72 includes the same exchange of messages 76 as that shown in FIG. 7. After selecting the portion asking about the waterproof properties of Brand Shoes, the context pane 80 is made prominent at the top of the context portion 84, above a viewed items pane 200, and the information concerning Brand Shoes is automatically scrolled to a tag 85 applied to the waterproof property and thus the modification in this example is the automatic navigation to the tagged corresponding information. It can be appreciated that the modifications 84 shown in FIGS. 7 and 8 are only illustrative and various other modifications 84 can be made, including filtering of information, focus/zoom operations, fading of unimportant information, etc.

Figure 9:
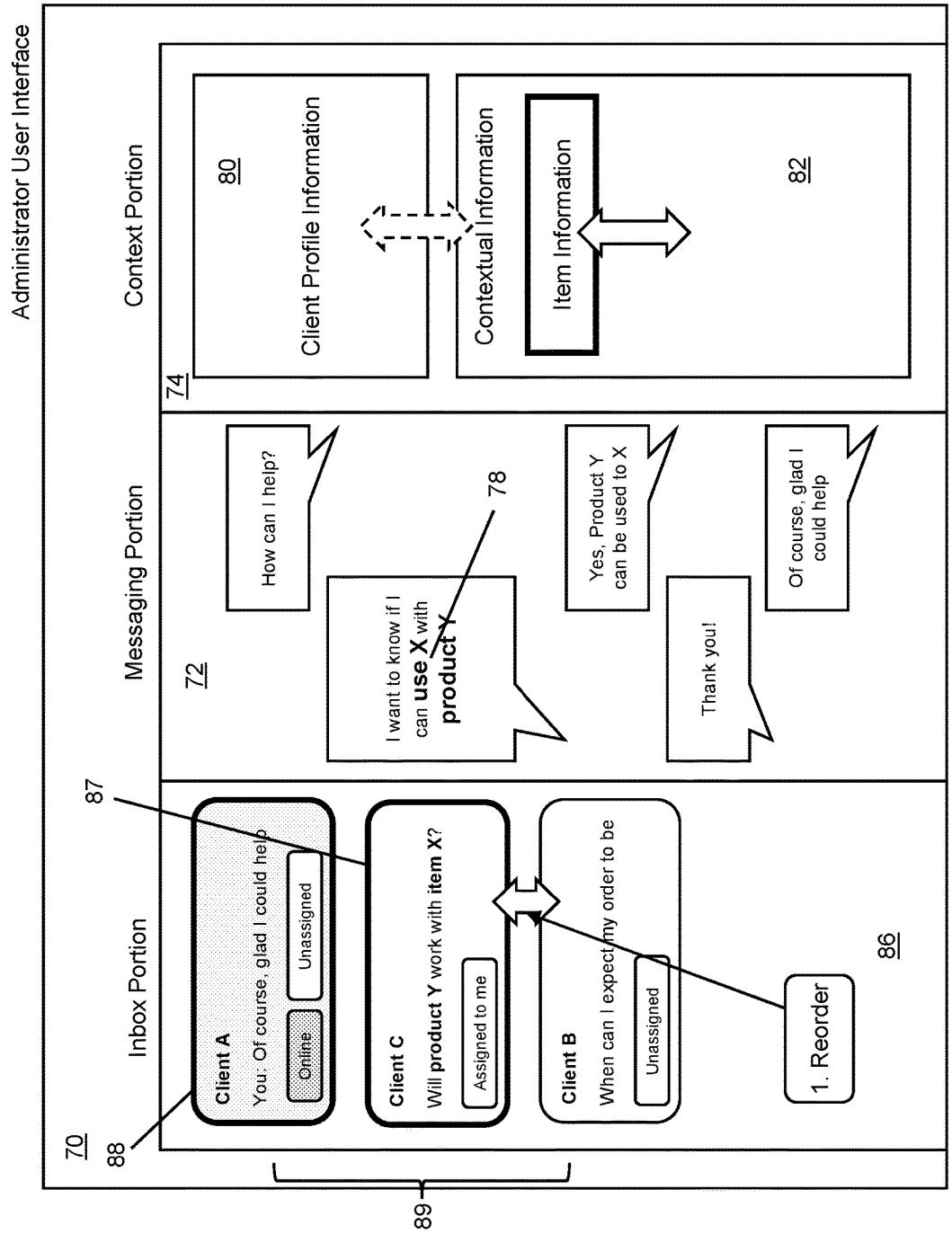
FIG. 9 shows an example of an administrator user interface with a reordered inbox portion executed in response to contextual data relevant to multiple conversational message exchanges.

Referring now to FIG. 9, other portions of the administrator UI 70 provided by the administrator UI controller 12 can also be modified based on the contextual information determined by the context module 24. In this example, the inbox portion 86 is modified to rearrange the list 89 of messaging exchanges 88 to reorder the Client C messaging exchange 88 to be adjacent to the Client A messaging exchange 88 at step 1 based on a similarity in content and/or context between these messaging exchanges 88. This avoids the admin user 18 being required to find other messaging exchanges 88 that would benefit from a current or recent exchange, for example, on a similar topic, which can be particularly time consuming when the admin user 18 has a large number of conversational messaging exchanges 88 that require attention at different times. Furthermore, reordering the messaging exchanges 88 can avoid the admin user 18 from the need to recall such similarities, which can be difficult when they are responsible for many exchanges over various periods of time. In the example shown in FIG. 9, despite the Client C messaging exchange 88 being dormant (e.g., offline or away from the chat), the admin user 18 is reminded of the commonality and provides an efficient way to then attend to a next message, without duplicating efforts, which may otherwise be required without leveraging the information used by the context module 24 in the other messaging exchange 88 with Client A. In this example, Client C had been inquiring whether product Y could be used with item X, which is the opposite of the question posed by Client A. In this way, the admin user 18 can pick up the conversation with Client C, armed with additional information that was gleaned from corresponding with Client A.

Figure 10A:
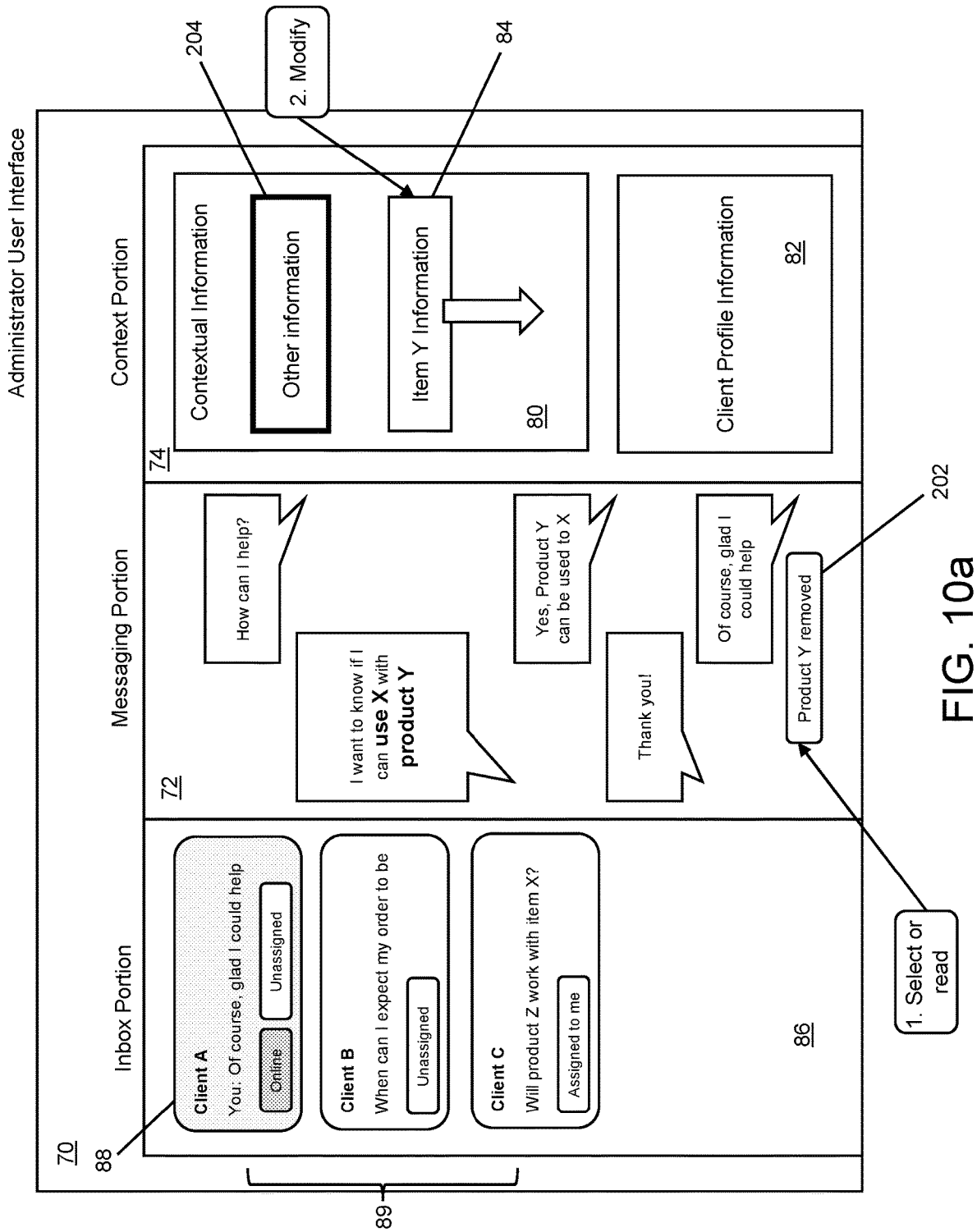
FIGS. 10a and 10b show an example of a contextual modification made in response to an indication of client user activity displayed in the messaging portion in this example.
Figure 10B:
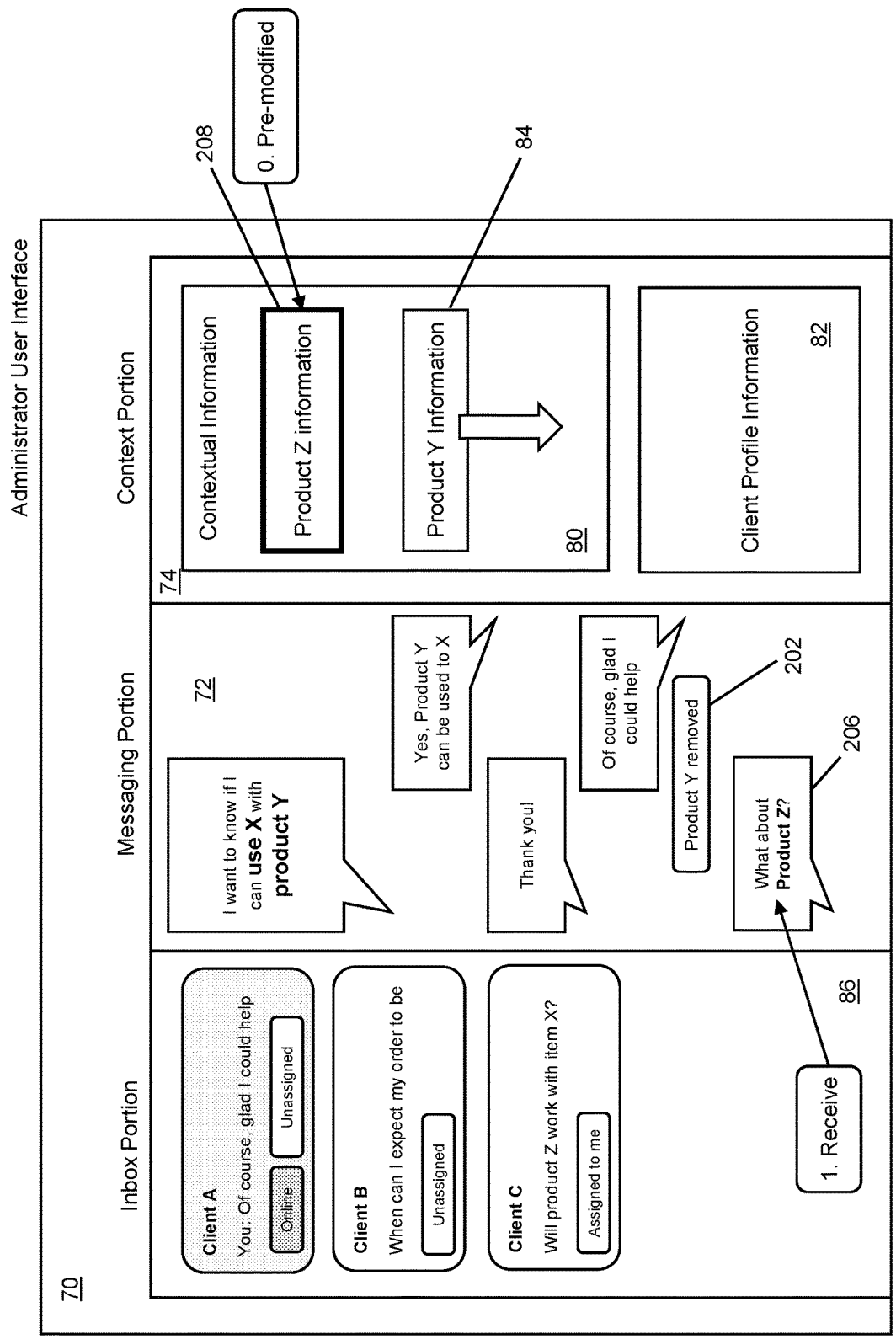

Other UI portions can also leverage the contextual information obtained by the context module 24, for example, the messaging portion 72 as shown in FIGS. 10a and 10b. Referring first to FIG. 10a, in this example, a separate interaction between the client user 36 and the service provider system 26 is indicated in the messaging portion 72 at the corresponding time using a notification 202, to provide the admin user 18 with additional context. By the admin user 18 selecting or even just reading the notification 202, the context module 24 can determine that Product Y, which has now been removed from the client user's shopping cart, may be deemphasized in the context pane 80 by performing a modification 84 that moves the Item Y information to a lower position than other information 204, in the context pane 80, at step 2. That is, additional contextual information can be displayed in the messaging portion 72 (or other portions such as the inbox portion 86) that are not included in a message 76 but itself provides a message in the form of a notification 202 that can be selected and interacted with in the same way as those examples above, to then have the context portion 74 of the administrator UI 70 dynamically modified. That is, the notification 202 can provide a balance between providing informative information and consuming display area to enable interactions with such notifications 202 to then trigger changes or modifications 84 in the context portion 74. The modifications 84 can therefore be triggered by interactions or signals associated with admin user actions, client user actions or system triggers such as changes to a profile, datastore, etc.

FIG. 10b illustrates an advancement of the exchange of messages 76 in the messaging portion 72, wherein the other information 204 from FIG. 10a can correspond to Product Z information that is pre-modified at step 0 since Product Z was either also browsed or is an expected alternative to Product Y. Then, at step 1 when a subsequent message 206 is received that says "What about Product Z", the context pane 80 is already modified to include this information. It can be appreciated that other premodifications can be made such as displaying a number of alternatives to Product Y when Product Y is removed (as detected when generating notification 202) and Product Z being moved to prominence as shown in FIG. 10b by the admin user 18 selecting the message 206 or the identified content asking about Product Z. The contextual information can thus be used in any one of the UI portions 72, 74, 86, 94 in the administrator UI 70 to create messages or identify information that relates to dynamically and automatically generated modifications 84 or to provide the admin user 18 with selectable content to retrieve such information on demand. The independent operability of the messaging portion 72 and context portion 74 also allows the context portion 74 to provide preemptive changes (as shown in FIG. 10b) or otherwise execute modifications 84 based on independent signaling cues or interaction inputs.

Figure 11:
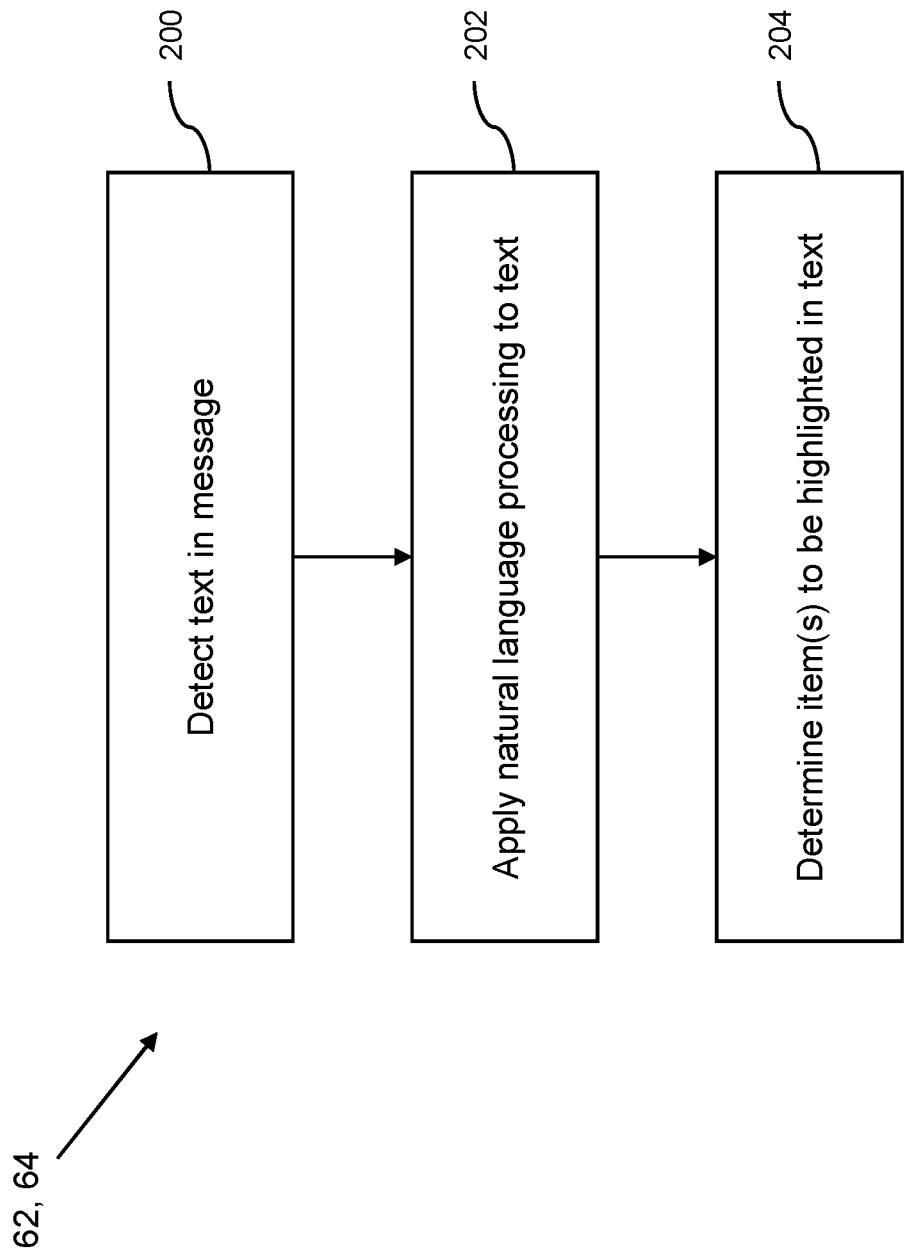
FIG. 11 is a flow chart illustrating example operations for applying natural language processing to text detected in a message.

As illustrated in FIGS. 4 through 10b, the context module 24 can use the machine learning tool 38 to determine context from text in a message 76, for example, by using the NLP module 39 to detect text using natural language processing, including techniques such as NER. Referring now to FIG. 11, example operations for executing blocks 62, 64 of FIG. 3 are shown. At block 200, the context module 24, or another module utilized by the messaging UI 30 detects text in a message 76 sent or received in a conversational messaging exchange 88. The detected text can then be processed at block 202 to apply natural language processing to the text using the NLP module 39. This enables the context module 24 to determine one or more items to be highlighted in the text at block 204, e.g., to identify a portion 78 of the message 76 as shown in FIGS. 4 through 10b. The NLP module 39 can apply various algorithms to detect the relevant text portions 78, including NER. NER is an information extraction operation that executes to locate and classify named entities mentioned in unstructured text into predefined categories such as person names, organizations, locations, items such as products, medical codes, time expressions, quantities, monetary values, percentages, etc. The determined portion(s) 78 of the message 76 can then be highlighted or otherwise identified as discussed above.

Figure 12:
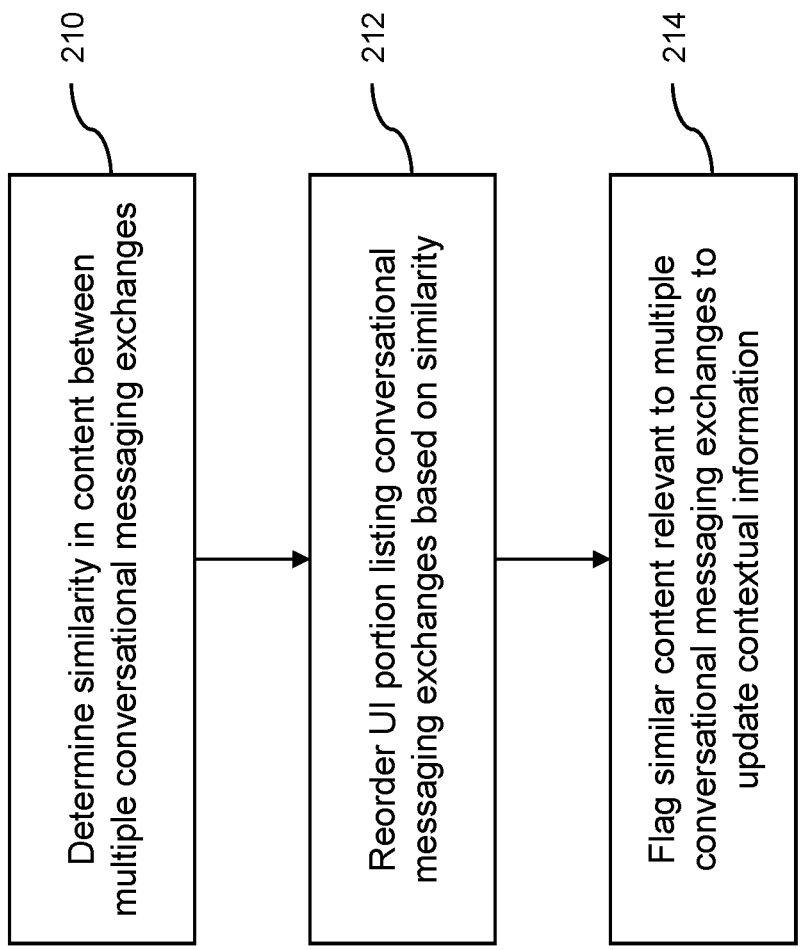
FIG. 12 is a flow chart illustrating example operations for reordering a list of conversational messaging exchanges based on a similarity in content between multiple conversational messaging exchanges.

Referring now to FIG. 12, example operations for reordering a list 89 of conversational messaging exchanges as illustrated in FIG. 9 are shown, based on similarities in content, e.g., questions related to Product Y in FIG. 9. At block 210, the context module 24 determines similarity in content between multiple conversational messaging exchanges 88. At block 212, the context module 24 reorders or causes the inbox portion 86 to reorder the listing 89 of the conversational messaging exchanges 88 based on the similarity. At block 214, the similar content that is relevant to multiple messaging exchanges 88 can be flagged, either visually or in the background, such that the contextual information in the context portion 74 is updated appropriately whether the admin user 18 is in any one of the multiple messaging exchanges 88. For example, the Product Y information can be emphasized in the context portion 74 for both the Client A and Client C messaging exchanges.

Figure 13:
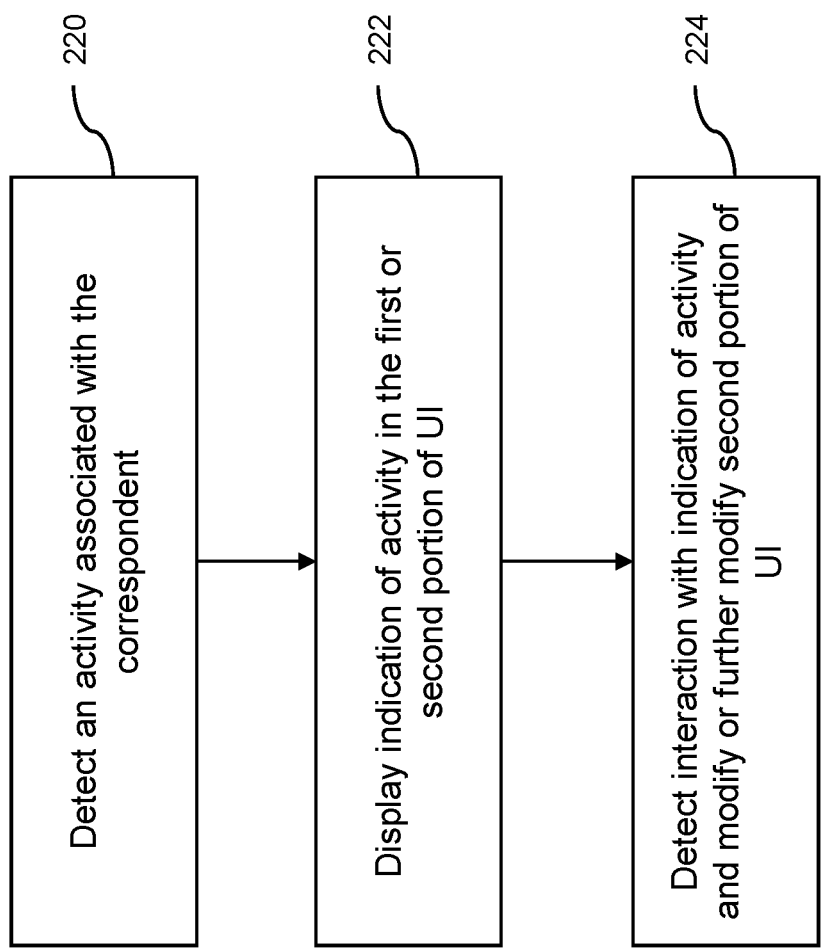
FIG. 13 is a flow chart illustrating example operations for displaying an indication of activities associated with a correspondent and enabling interactions with the indication of activity to modify or further modify the administrator user interface.

Referring now to FIG. 13, example operations are shown for modifying a messaging portion of an administrator UI 70 as illustrated in FIGS. 10a and 10b. At block 220, the context module 24 detects an activity associated with a correspondent in the messaging exchange 88 and at block 222 displays an indication of the activity, e.g., using notification 202 in either the context portion 74 (first portion) or messaging portion 72 as shown in FIGS. 10a and 10b (second portion). The operations in FIG. 13 can thus be applied to cross-reference activity information in any of the UI portions that involve the correspondent or contextual information regarding that correspondent or relevant items, to provide additional context to the admin user 18 outside of the messages 76 themselves.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 14:
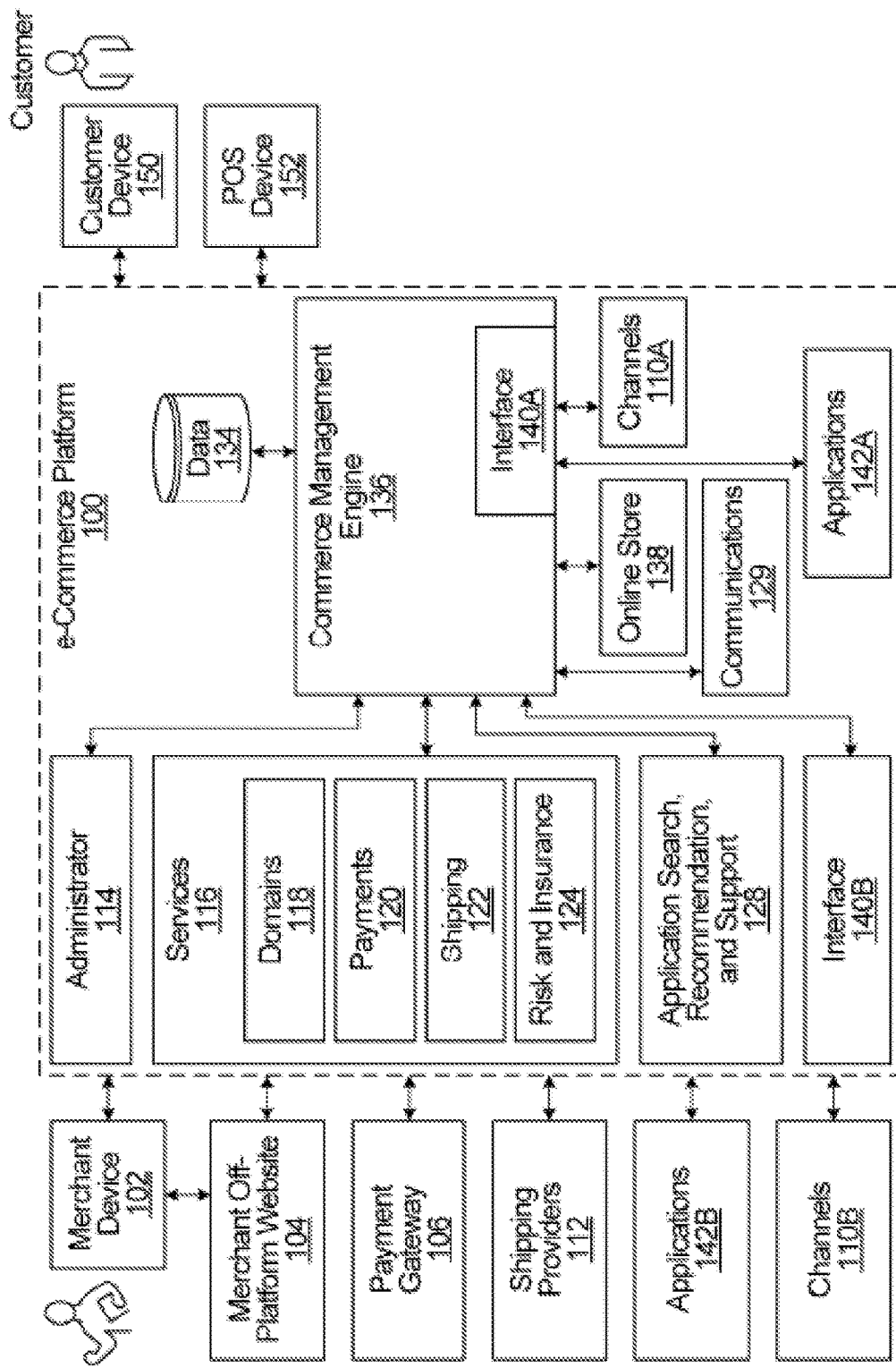
FIG. 14 is a block diagram illustrating an example of a configuration for an e-commerce platform.

FIG. 14 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 14, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 15:
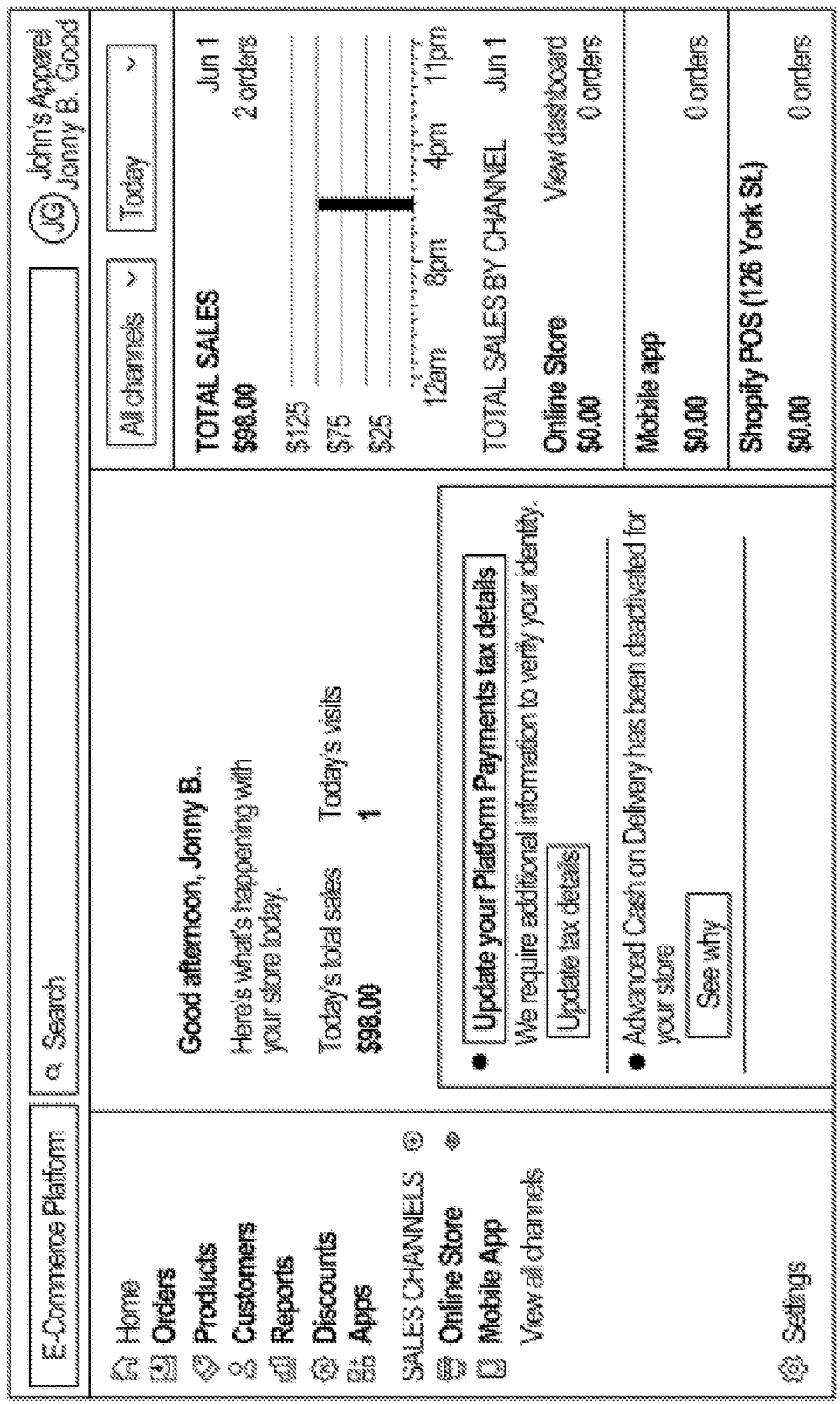
FIG. 15 shows an example of a user interface for interacting with the e-commerce platform shown in FIG. 14.

FIG. 15 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 15. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 14, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to obtain or capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date based ledger that records sale-related events that happened to an item).

Implementation in an e-Commerce Platform

Figure 16:
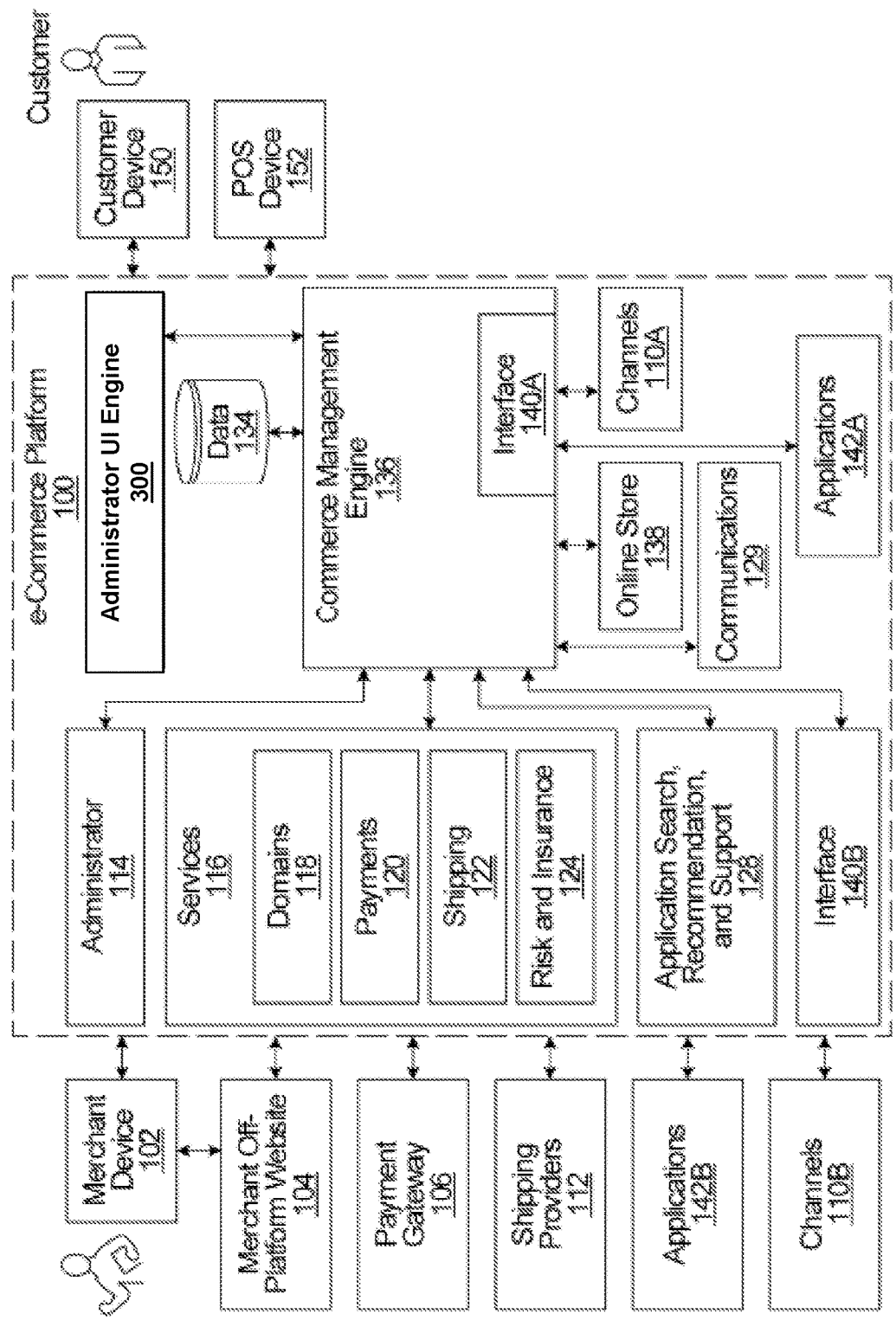
FIG. 16 is a block diagram illustrating an example of the e-commerce platform of FIG. 14 with an integrated administrator user interface engine.

The functionality described herein may be used in commerce to provide improved customer or buyer experiences. The e-commerce platform 100 could implement the functionality for any of a variety of different applications, examples of which are described elsewhere herein. FIG. 16 illustrates the e-commerce platform 100 of FIG. 10 but including an administrator UI engine 300. The engine 300 is an example of a computer-implemented system that implements the functionality described herein for use by the e-commerce platform 100, the customer device 150 and/or the merchant device 102.

Although the engine 300 is illustrated as a distinct component of the e-commerce platform 100 in FIG. 16, this is only an example. An engine could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides that engine. However, the location of the engine 300 is implementation specific. In some implementations, the engine 300 is provided at least in part by an e-commerce platform, either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application. The e-commerce platform 100 can therefore be considered an example of a computing environment 10 in which the service provider application 28 and administrator UI controller 12 are implemented as an engine 300, coupled to the commerce management engine 136 and/or interface 140B to enable the administrator UI functionality to be integrated into an administrator UI 70 displayed by the administrator UI controller 12 to the merchant device 102, the customer device 150, or both.

The engine 300 could implement at least some of the functionality described herein, for example based on the examples shown in FIGS. 4 through 10b. Although the embodiments described below may be implemented in association with an e-commerce platform, such as (but not limited to) the e-commerce platform 100, the embodiments described below are not limited to e-commerce platforms.

For simplicity and clarity of illustration, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10, e-commerce platform 100, or engine 300, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method, comprising:
receiving a message from a correspondent in a conversational message exchange;
processing the message to detect at least one portion of the message indicative of an item;
displaying the message in a first portion of a user interface and identifying the at least one portion of the message, the user interface being divided into a plurality of areas and having the first portion displayed in a first area of the plurality of areas and a second portion displayed in a different second area of the plurality of areas that is separate from the first portion;
detecting an interaction with the message; and
modifying the second portion of the user interface comprising content associated with the correspondent, according to the interaction with the message, the modifying comprising displaying content associated with the item indicated by the first portion of the user interface.

2. The method of claim 1, wherein the at least one portion of the message comprises text identifying the item or an attribute of the item, and the interaction with the message comprises an interaction with the text.

3. The method of claim 1, wherein modifying the second portion of the user interface comprises reordering the content associated with the correspondent to provide a focus on the item.

4. The method of claim 3, further comprising scrolling through the content to identify an attribute of the item.

5. The method of claim 1, wherein processing the message comprises applying a natural language processing (NLP) process to text in the message.

6. The method of claim 5, wherein the NLP process comprises a named entity recognition process used to identify the item.

7. The method of claim 1, wherein the user interface comprises a third portion displaying a list comprising a plurality of conversational message exchanges, each comprising at least one different respective correspondent.

8. The method of claim 7, further comprising reordering the list in the third portion of the user interface based on a similarity between at least two conversational message exchanges in the list.

9. The method of claim 8, wherein reordering the list comprises grouping the at least two conversational message exchanges in the list.

10. The method of claim 9, wherein grouping the at least two conversational message exchanges is based on content being prepared in one conversational message exchange that is relevant to at least one other conversational message exchange.

11. The method of claim 1, wherein reordering the list is based at least in part on the item detected in the message.

12. The method of claim 1, wherein a plurality of portions of the message indicative of the item are detected, and wherein modifying the second portion of the user interface considers the plurality of portions.

13. The method of claim 12, wherein a first portion of the message names the item and a second portion of the message comprises an attribute of the item.

14. The method of claim 13, wherein modifying the second portion of the user interface comprises displaying a set of features for the item and tagging the attribute of the item.

15. The method of claim 14, further comprising scrolling to the attribute based on a tag applied to the attribute.

16. The method of claim 1, wherein the interaction with the message comprises an activity associated with the correspondent.

17. The method of claim 16 further comprising:
displaying an indication of the activity associated with the correspondent in the first or second portion of the user interface, the indication being actionable to modify or further modify the second portion of the user interface.

18. The method of claim 17, wherein the activity comprises a second interaction by the correspondent with a merchant site.

19. The method of claim 18, wherein the second interaction comprises viewing one or more items or adding or removing the one or more items to/from a checkout mechanism.

20. A system comprising:
at least one processor; and
at least one memory, the at least one memory comprising computer executable instructions that, when executed by the at least one processor, cause the system to:
receive a message from a correspondent in a conversational message exchange;
process the message to detect at least one portion of the message indicative of an item;
display the message in a first portion of a user interface and identifying the at least one portion of the message, the user interface being divided into a plurality of areas and having the first portion displayed in a first area of the plurality of areas and a second portion displayed in a different second area of the plurality of areas that is separate from the first portion;
detect an interaction with the message; and
modify the second portion of the user interface comprising content associated with the correspondent, according to the interaction with the message, the modifying comprising displaying content associated with the item indicated by the first portion of the user interface.

21. A computer readable medium comprising computer executable instructions that when executed by a processor, cause the processor to execute instructions comprising:
receiving a message from a correspondent in a conversational message exchange;
processing the message to detect at least one portion of the message indicative of an item;
displaying the message in a first portion of a user interface and identifying the at least one portion of the message, the user interface being divided into a plurality of areas and having the first portion displayed in a first area of the plurality of areas and a second portion displayed in a different second area of the plurality of areas that is separate from the first portion;
detecting an interaction with the message; and modifying the second portion of the user interface comprising content associated with the correspondent, according to the interaction with the message, the modifying comprising displaying content associated with the item indicated by the first portion of the user interface.

* * * * *